United States Patent
Fletcher et al.

(10) Patent No.: US 9,485,357 B2
(45) Date of Patent: Nov. 1, 2016

(54) SPLITTING A CALL FOR AN EMERGENT EVENT INTO MULTIPLE DEVICES USING DATA CHANNELS

(71) Applicant: Avaya Inc., Santa Clara, CA (US)

(72) Inventors: Mark J. Fletcher, Ringwood, NJ (US); Parameshwaran Krishnan, Basking Ridge, NJ (US); Joann J. Ordille, Lebanon, NJ (US); Navjot Singh, Somerset, NJ (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/673,430

(22) Filed: Mar. 30, 2015

(65) Prior Publication Data

US 2016/0295016 A1   Oct. 6, 2016

(51) Int. Cl.
  *H04M 11/00* (2006.01)
  *H04M 3/51* (2006.01)
(52) U.S. Cl.
  CPC .................................. *H04M 3/5116* (2013.01)
(58) Field of Classification Search
  None
  See application file for complete search history.

(56) References Cited

U.S. PATENT DOCUMENTS

| | | | | |
|---|---|---|---|---|
| 2001/0028711 | A1* | 10/2001 | Antonucci | H04M 3/42 379/245 |
| 2008/0175356 | A1* | 7/2008 | Seidberg | G08B 25/08 379/45 |
| 2009/0168974 | A1 | 7/2009 | McCormick | |
| 2010/0235218 | A1 | 9/2010 | Erhart et al. | |
| 2010/0296417 | A1 | 11/2010 | Steiner | |
| 2011/0013541 | A1 | 1/2011 | Croy et al. | |
| 2011/0125793 | A1 | 5/2011 | Erhart et al. | |
| 2011/0125826 | A1 | 5/2011 | Erhart et al. | |
| 2011/0255683 | A1 | 10/2011 | Flockhart et al. | |
| 2012/0100824 | A1* | 4/2012 | Michael | H04W 4/22 455/404.2 |
| 2012/0202525 | A1* | 8/2012 | Pettini | H04W 4/043 455/456.3 |
| 2012/0320912 | A1* | 12/2012 | Estrada | H04M 3/5116 370/389 |
| 2013/0272565 | A1* | 10/2013 | Fagundes | H04M 3/523 382/100 |
| 2015/0085997 | A1* | 3/2015 | Biage | H04M 3/00 379/45 |
| 2015/0358171 | A1* | 12/2015 | Rosenberg | H04L 12/1822 709/204 |

* cited by examiner

*Primary Examiner* — Maria El-Zoobi
(74) *Attorney, Agent, or Firm* — Sheridan Ross P.C.

(57) ABSTRACT

Public safety access points (PSAP), such as 911 and e911 service providers, are often overwhelmed with information coming from a number of callers. As part of an initial assessment, a determination is often made as to whether two or more callers are calling about the same emergent event. If two or more callers are calling about the same emergent event, the callers and PSAP may interact at the same time but differently, such as different content or different media types. As a benefit, on-site activities may be coordinated in a manner that helps reduce the demands on PSAP resources and helps to facilitate a more accurate and appropriate response to the emergent event.

20 Claims, 5 Drawing Sheets

SPLITTING A CALL FOR AN EMERGENT EVENT INTO MULTIPLE DEVICES USING DATA CHANNELS

FIELD OF THE DISCLOSURE

The present disclosure is generally directed toward the management of communication devices associated with an emergent event.

BACKGROUND

Coordinating multiple callers with a single Public Service Access Point (PSAP) agent has proven difficult if not impossible using traditional PSAP systems. Specifically, when every caller to a PSAP is using a voice channel to communicate with the PSAP, it is difficult if not impossible for the PSAP agent to communicate with multiple callers simultaneously, even if the multiple callers are calling in regards to the same emergent event. In particular, attempts to establish audio conferences between multiple callers and a single PSAP agent have been proposed but have not been widely implemented. This lack of acceptance is often due to the confusion that often ensues when communicating with more than one person about an emergent event. The difficulty is further exacerbated when one or more of the callers is hysterical or otherwise difficult to communicate with.

Because of these and other difficulties, when a PSAP system receives calls from multiple callers at substantially the same time, the current practice is to connect callers to an available PSAP agent, for a one-on-one interaction, and make the other callers wait until a PSAP agent becomes available.

SUMMARY

It is with respect to the above issues and other problems that the embodiments presented herein were contemplated.

In one embodiment, the use of multiple data channels is disclosed to help a single PSAP agent coordinate multiple parties. The parties may or may not correspond to individuals that originally called to report an emergent event. When an emergent event is identified, the location of that event may be determined and data channels established with at least one device, and the associated user, within a predetermined proximity of that emergent event. In another embodiment, the establishment of the data channel is performed regardless of whether or not such users called the PSAP. In another embodiment, simultaneous conferencing of multiple calls on a shared data channel (near-real-time) is provided, which may facilitate more efficient utilization of PSAP resources. In another embodiment, a PSAP agent establishes multiple data channels with different individuals within a predetermined proximity of an emergent event. For example, three users are determined to be within a predetermined distance of an emergent event. Each user may receive a text/SMS message requesting the establishment of a different data channel. Each data channel may be then be used to provide different instructions or information to each user. As a result, a PSAP agent may coordinate multiple individuals proximate to the emergent event with relative ease and accuracy. Each of the devices may receive the same, similar or different instructions or information to help provide a complete response to an event.

In one example, callers A, B, and C each call the PSAP to report a common emergent event, such as an auto-pedestrian accident. The PSAP can determine, with a certain probability that each caller is calling to report the same event, such as due to each caller having approximately the same location. As the calls enter the PSAP, each caller may be asked to join a shared data channel that is being managed by a single PSAP agent. The PSAP agent may use the shared data channel to obtain information about the event (e.g., receive pictures, videos, or text messages regarding the emergency event) and build knowledge about the event through the information obtained via the data channel. Simultaneously, the PSAP agent may also use the data channel to simultaneously manage the calls from each of the callers. If it is determined that injuries have occurred, the PSAP agent may utilize the data channel to identify the best caller to handle the injuries (e.g., identify someone with medical background or someone closest to the event) and provide instructions for handling the injuries. This caller may also have their voice call connected to the PSAP agent so that the live voice of the PSAP agent can be focused on the closest caller. The data channel may simultaneously provide information to the other callers, such as, "Agent is helping injured party X (perhaps even showing a picture)—if you notice other injured parties, please press <THIS BUTTON>." If the caller presses the button indicating that someone else is injured, then another agent can be assigned to that caller or the same PSAP agent may provide instructions for treating the other injured party via the data channel.

Other callers may receive other information via the data channel. For instance, another caller not directly handling the injuries may be provided with instructions for meeting an ambulance or other first responder or for re-directing traffic.

Mechanisms that can be used to establish the data channels include, but are not limited to, text messages, infrared, Bluetooth, near-field communications, etc. Such communication mechanisms can be used to share information that would enable the establishment of the data channel and/or to add another nearby device to an already-established data channel.

By utilizing the shared data channel, a single PSAP resource (e.g., an agent) can interact with multiple callers simultaneously.

In one embodiment, a system is disclosed, comprising: a public safety access point (PSAP), comprising: a PSAP resource; and a PSAP server that, upon determining that a first PSAP caller and a second PSAP caller are both calling the PSAP with respect to a common emergent event, enabling a PSAP resource to simultaneously and differently interact with the first PSAP caller and the second PSAP caller over a first and second data channel, respectively.

In another embodiment, a method is disclosed comprising: establishing a first data channel connection between a public safety access point (PSAP) and a first customer device and a second data channel second connection between the PSAP and a second customer device associated with a first and second PSAP caller, respectively; determining, by a PSAP server, whether the first and second PSAP callers are reporting the same emergent event; and upon determining the first and second PSAP callers are reporting a common emergent event, causing a PSAP resource to simultaneously interact via the first data channel with the first PSAP caller and via the second data channel with the second PSAP caller with respect to the emergent event.

In another embodiment, a non-transitory computer readable medium is disclosed that when read by a computer causes the computer to perform: establishing a first data channel connection between a public safety access point (PSAP) and a first customer device and a second data channel second connection between the PSAP and a second customer device associated with a first and second PSAP caller, respectively; determining, by a PSAP server, whether the first and second PSAP callers are reporting the same emergent event; and upon determining the first and second PSAP callers are reporting a common emergent event, causing a PSAP resource to simultaneously interact via the first data channel with the first PSAP caller and via the second data channel with the second PSAP caller with respect to the emergent event.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module," as used herein, refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Any reference in the description comprising an element number, without a subelement identifier when a subelement identifiers exist in the figures, when used in the plural is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
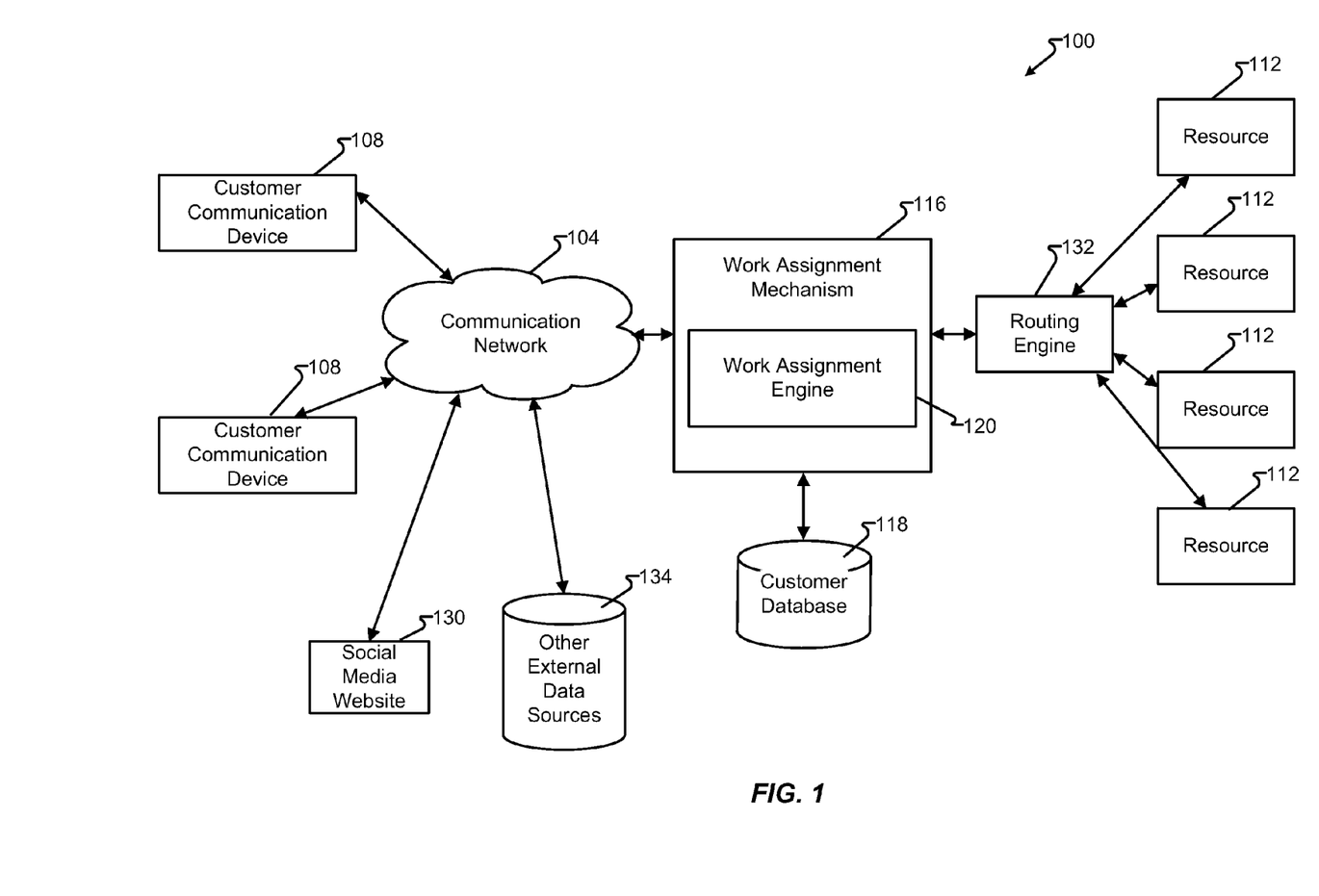
FIG. 1 depicts a communication system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from customer communication devices 108. Additionally, social media website 130 and/or other external data sources 134 may be utilized to provide one means for a resource 112 to receive and/or retrieve contacts and connect to a customer of a contact center. Other external data sources 134 may include data sources, such as service bureaus, third-party data providers (e.g., credit agencies, public and/or private records, etc.). Customers may utilize their respective customer communication device 108 to send/receive communications utilizing social media website 130.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. Patent Publication No. 2010/0296417 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Illustrative work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784, 369, 12/706,942, and 12/707,277, filed Mar. 20, 1010, Feb. 17, 2010, and Feb. 17, 2010, respectively, each of which is hereby incorporated herein by reference in its entirety.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 132 to connect the communication device 108, which initiated the communication with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to the contact center. Customer database 118 may be updated in response to a work item and/or input from resource 112 processing the work item.

In one embodiment, a message is generated by customer communication device 108 and received, via communication network 104, at work assignment mechanism 116. The message received by a contact center, such as at the work assignment mechanism 116, is generally, and herein, referred to as a "contact." Routing engine 132 routes the contact to at least one of resources 112 for processing.

Figure 2:
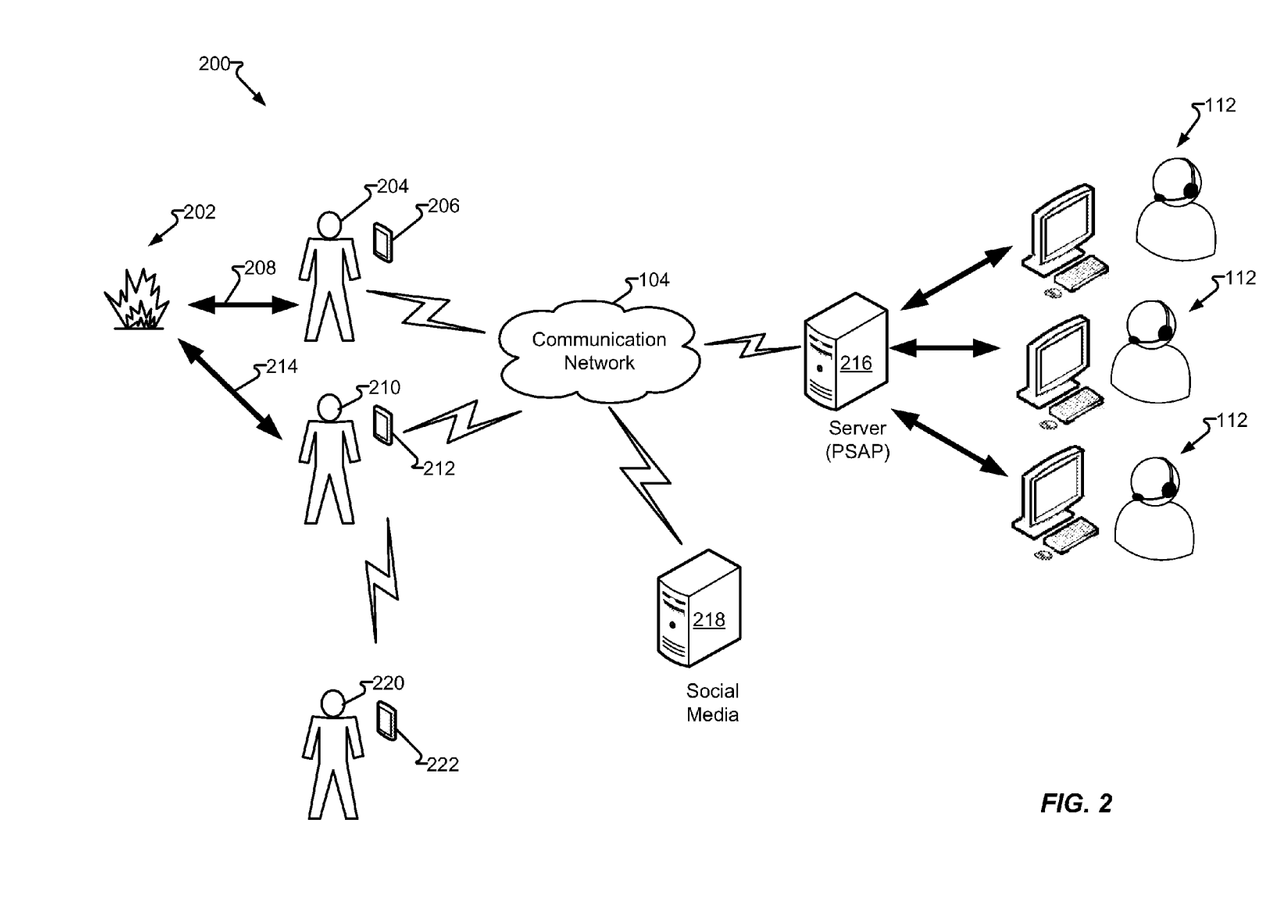
FIG. 2 illustrates a system in accordance with at least some embodiments of the present disclosure.

FIG. 2 illustrates system 200 in accordance with at least some embodiments of the present disclosure. In one embodiment, emergent event 202 is being reported by first PSAP caller 204 and second PSAP caller 210 utilizing first user device 206 and second user device 212, respectively. One or more of a number of resources 112 may then process calls via interactions utilizing PSAP server 216. First user device 206 and second user device 212 may be selected from customer communication devices 108 having at least an ability to communicate using a data channel. Position 208 is the spatial and/or positional relationship between emergent event 202 and first PSAP caller 204. Position 208 may comprise one or more of distance, direction, height, line of sight, etc. Similarly, position 214 describes a spatial and/or positional relationship between emergent event 202 and second PSAP caller 210 and may comprise one or more of distance, direction, height, line of sight, etc. First user device 206 and second user device 212 each comprises functionality beyond that required for voice-only communications. More specifically, first user device 206 and second user device 212 are each operable to establish a data channel with PSAP server 216 for interactions therewith. Optionally, one or more of first user device 206 and second user device 212 comprise functionality to take photos, take video, capture audio, receive GPS data, send and receive text messages, launch applications, and otherwise perform functions generally associated with a, "smart phone."

Resources 112 may, as more fully described with respect to FIG. 1, may comprise a human agent, automated agent, or a combination (e.g., a human agent utilizing a computer, telephony endpoint, or other device to facilitate interactions comprising speech, text, video, images, data files, location information, URLs, or other media types). First user device 206 and second user device 212 interact with the PSAP server 216 and agent interaction devices connected thereto via the communication network 104. In some embodiments, the PSAP server 216 enables a single resource 112 to simultaneously interact with multiple users and/or user devices via various communication channels. As an example, PSAP server 216 may initially receive a voice-channel communication (e.g., POTS, cellular-based voice, etc.) or a voice portion of a data channel (e.g., VoIP, SIP, etc.) utilizing first user device 206 and/or second user device 212. The interaction between a user device (e.g., first user device 206) and PSAP server 216 may be initiated using a data channel, even if the data channel is initially used only for voice, the data channel may be further utilized for the transfer of multimedia and/or other content as described herein. If the interaction is initiated with a voice-only communication channel, PSAP server 216, may prompt the user device and/or user to cause their respective user device (e.g., first user device 206, second user device 212, etc.) to establish a data interaction connection. The establishment of a data channel is provided to convey data packets, such as Internet Protocol (IP) packets over communication network 104 and may further comprise a WebRTC, web (e.g., HTML5), or other data channel paradigm. In one embodiment, a data channel connection is established for each of first user device 206 and second user device 212.

In another embodiment, PSAP server 216 combines calls when they are associated with the same emergent event, such as emergent event 202. It should be noted that the term "call," as used herein includes, but is not limited to, voice-based audio communications and may comprise video, images, text, data, and/or other content. PSAP server 216 may further prioritize calls in a call queue for processing by a resource 112, herein resource 112. PSAP server 216 may determine first PSAP caller 204 and second PSAP caller 210 are each reporting emergent event 202 based upon one or more factors, such as commonality between position 208 and position 214, geospatial coordinates reported from a GPS sensing module within first user device 206 and/or second user device 212, spoken position determined from a speech to text module, description of emergent event 202, identification of first PSAP caller 204 by second PSAP caller 210 or vice versa, position related to a landmark, and/or other description of emergent event 202, position of one of first PSAP caller 204 relative to second PSAP caller 210, position relative to an actual or potential expansion of emergent event 202, position relative to an actual or potential extension of emergent event 202, and/or other position or location. For example, first PSAP caller 204 may report emergent event 202 (e.g., a fire) and second PSAP caller 204 may report emergent event 202 (e.g., smoke coming from behind a building between second PSAP caller 204 and emergent event 202). An example of a potential extension may comprise second PSAP caller 204 being able to determine whether an emergent event 202 (e.g., a fire) has spread to a location not visible by first PSAP caller 204. An example of an extension of an emergent includes second PSAP caller 210 reporting a suspicious occupant of a parked car while close by, first PSAP caller 204 is reporting the location of an apparent robbery, second PSAP caller 210 may be reporting an extension of emergent event 202, namely the presence of a potential get-a-way driver for the robbers.

In another embodiment, PSAP server 216 may be the initiator of the data channel connection with one or more of first PSAP caller 204, via first user device 206, and second PSAP caller, via second user device 212. The call may be triggered by a voice-only call, text message, or other communication leading to the establishment of the data channel connection. In one embodiment, PSAP server 216 may receive location information for first user device 206 and/or second user device 212 as being proximate to emergent event 202 and/or a in a location suitable to assist in the gathering of information by PSAP server 216 and/or resource 112 and/or mitigating emergent event 202. In another embodiment, the location of first user device 206 and/or second user device 212 may be determined by PSAP server 216 upon accessing social media content on social media server 218 that was provided by first PSAP caller 204 and/or second PSAP caller 210, respectively, such as media files and/or commentary associated with emergent event 202.

PSAP server 216 may, at any point while engaged in interaction with first user device 206 and/or second user device 212, obtain information from secondary sources. One secondary source is social media server 218. Social media server 218 may be prompted, such as by searching for key terms related to emergent event 202 to receive social media content related to emergent event 202. In another embodiment, social media server 218 may report emergent event 202, or events similar to emergent event 202, to PSAP server 216 as a push announcement. Emergent event 202 may comprise a number of issues, which must be prioritized and potentially addressed by responders. For example, emergent event 202 may be a fire and warrant a response by firefighters, but also dispatch an appropriate number of ambulances, and/or low-priority responders, such as traffic officers to redirect traffic issues around emergent event 202.

Resource 112 may engage in interaction with first user device 206 and/or second user device 216 directly, or via an input to PSAP server 216, which provides interactions thereto. Resource 112 may specifically provide data channel content to first PSAP caller 204 and second PSAP caller 210, comprising instructions, inquiries, or other content at the same time and yet dissimilar in terms of media type, content sent, content received, or other differentiator. For example, emergent event 202 may comprise a medical emergency, such as a victim suffering a heart attack. In one embodiment, resource 112 may initiate, approve, and/or supervise PSAP server 216 issuing instructions to first PSAP caller 204 and/or second caller 218 to play an animation illustrating cardiopulmonary resuscitation (CPR) while at the same time the other of first PSAP caller 204 and second PSAP caller 210 receives instructions to view the video and prepare to begin CPR on the victim. As a benefit, first PSAP caller 204 may position first user device 206, playing the CPR instructions, such that second PSAP caller 210 is able to see and/or hear (second PSAP caller 210 being unable to use or hold second user device 212 while in the act of performing CPR). As a further example, second user device 212 may present additional audio or video instructions received from medical personnel and/or receive video/audio from first user device 206. In yet another example, PSAP server 216, optionally with guidance and/or instructions and/or supervision from resource 112, may communicate with first user device 206 and second user device 212 to help guide emergency responders. PSAP server 216 may select one location for first PSAP caller 204 and provide to first PSAP caller 204 instructions as to where first PSAP caller 204 should position themselves, such as by causing first user device 206 to display directions and/or a map. Similarly, PSAP server 216, with direction and/or supervision of resource 112, may provide a different location for second PSAP caller 210 to position themselves whereby the instructions are similarly delivered by map, or other instructions delivered to a second user device 212. As a benefit, responders may find the location of emergent event 202 with the assistance of first PSAP caller 204 and a first location and second PSAP caller 210 at a second location.

PSAP server 216 may additionally select one or more of the callers, such as second PSAP caller 210, to communicate via second user device 212, with third-party device 222 and thereby establish a direct interaction with third-party 220. Third party 220 may be an on-site responder or other party who is or may become engaged to mitigate emergent event 202.

Figure 3:
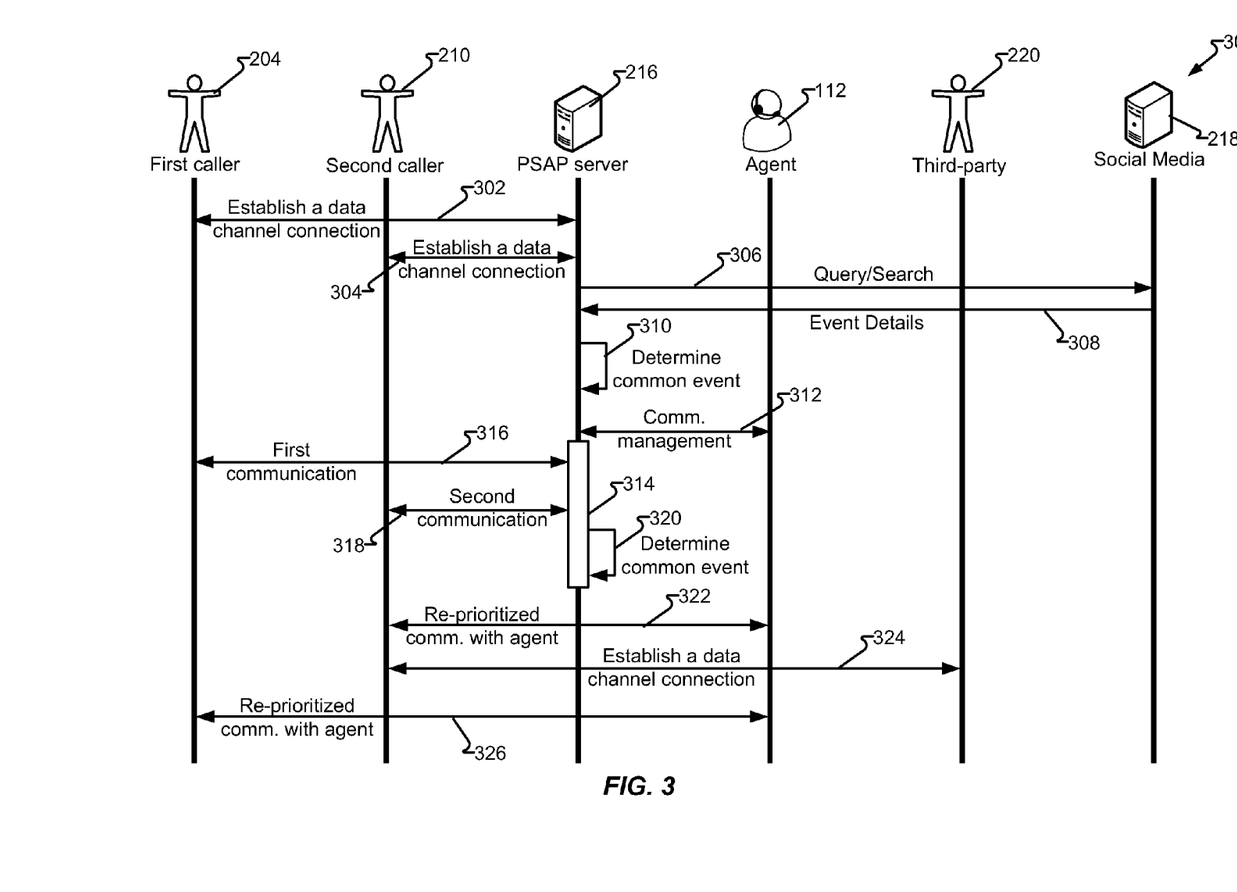
FIG. 3 illustrates interaction in accordance with at least some embodiments of the present disclosure.

FIG. 3 illustrates interaction 300 in accordance with at least some embodiments of the present disclosure. In one embodiment, first PSAP caller 204, utilizing first user device 206 (not shown), establishes data connection 302 with PSAP server 216. Second PSAP caller 210, utilizing second user device 210 (not shown), then establishes a data connection with PSAP server 216 at step 304. PSAP server may be a stand-alone component or comprise, be compromised by, or co-processing with components of the PSAP server, including, but not limited to, one or more of work assignment mechanism 116, work assignment engine 120, routing engine 132, and automated resources 112. Optionally, PSAP server 216 may query, at step 306, social media server 218 to receive event details 308 regarding an emergent event, such as emergent event 202. PSAP server 216 may query social media server 218 or alternatively social media server 218 may provide event details at step 308 as push notifications. Furthermore, query step 306 and/or receiving event details step 308 may be performed prior, during, or after to one or more of step 302 and 304. Step 310 then determines commonality for the emergent event provided by two or more of first PSAP caller 204, second PSAP caller 210, and social media server 218. If one of first PSAP caller 204, second PSAP caller 210, or social media server 218 is reporting a different event the different event may be processed separately from emergent event 202.

While automation is obtainable from the embodiments disclosed herein, resource 112 may supplement the interactions established during steps 302, 304. For example, interactions step 312, and optionally at any point until interaction with first PSAP caller 204 and/or second PSAP caller 210 has been terminated, may comprise interactions from resource 112 (e.g., images, speech, etc.). In another embodiment, resource 112 may approve, trigger, and/or monitor interactions to or from PSAP server 216 with PSAP server 216 determining the content and/or form of the interactions with each of first user device 206 and second user device 212, simultaneously at step 314. Interactions performed at steps 316 and 318 may differ in terms of content and/or media type and may further differ in terms of media type originating from first user device 206 as compared to second user device 212. For example first PSAP caller 204 may receive content comprising instructions, such as to go to the corner of First and Main Street to direct emergency responders. Whereas second PSAP caller 210 may receive content comprising instructions, such as to go to the corner of Second and Elm Street to provide additional guidance to emergency responders or direction for a different emergency responder. In another example, first PSAP caller 206 may provide a first set of video images of emergent event 202 while second PSAP caller 210 provides a second set of video images, still images, audio, or other different media and/or media type. Media type may differ in terms of audio, video, text, position information, etc. For example, first PSAP caller 204 may receive audio instructions via first user device 206 for the performance of CPR and second PSAP caller 210 may receive video instructions, such as to hold in a position visible to first PSAP caller 204 while performing CPR.

Step 320 may execute once, periodically, upon an event, or continually, such as to evaluate information received from one or more of first PSAP caller 204, second PSAP caller 210, and optionally social media server 218. For example, PSAP server 216 may already be aware of emergent event 202. The report by first PSAP caller 204 and second PSAP caller 210 is therefore de-prioritized, to better avoid overwhelming resource 112 with what is likely already known information. Typically, calls are answered by resource 112 in a FIFO queue order. However, step 320 may determine that second interaction 318 provides content to PSAP server 216 that is different and determined, by step 320, to be more relevant than that of first interaction received at step 316. For example second PSAP caller 210 may be providing still images or video information regarding the emergent event. Second PSAP caller 210 may then be placed in a higher position in the queue to connect with resource 112, the content of the still or video may or may not be evaluated for relevancy as it may be assumed that a video feed proximate to emergent event 202 is relevant. Step 322 may then reprioritize the queue order such that second PSAP caller 210 is processed prior to first PSAP caller 204.

In another embodiment, step 324 provides for the establishment of a data channel connection between second PSAP caller 210 and third-party 220, utilizing third party device 222 (not shown). Third-party data channel connection at step 324 may be provided in response to a prompt from PSAP server 216 and/or resource 112. Third-party 220 may be, for example, an on-site responder, en-route responder, or other party selected by PSAP server 216 and/or resource 112. As a further embodiment, second PSAP caller 210 may establish a non-data channel interaction with third-party 220, such as when third-party 220 is unable to establish a data channel interaction.

Following step 322, step 326 provides for the reprioritized interaction of first PSAP caller 204 for interaction with resource 112. Similar to that described above with respect to step 324, first PSAP caller 204 may also be prompted to establish a data channel connection with third-party 220 or another party (not shown).

Figures 4, 5:
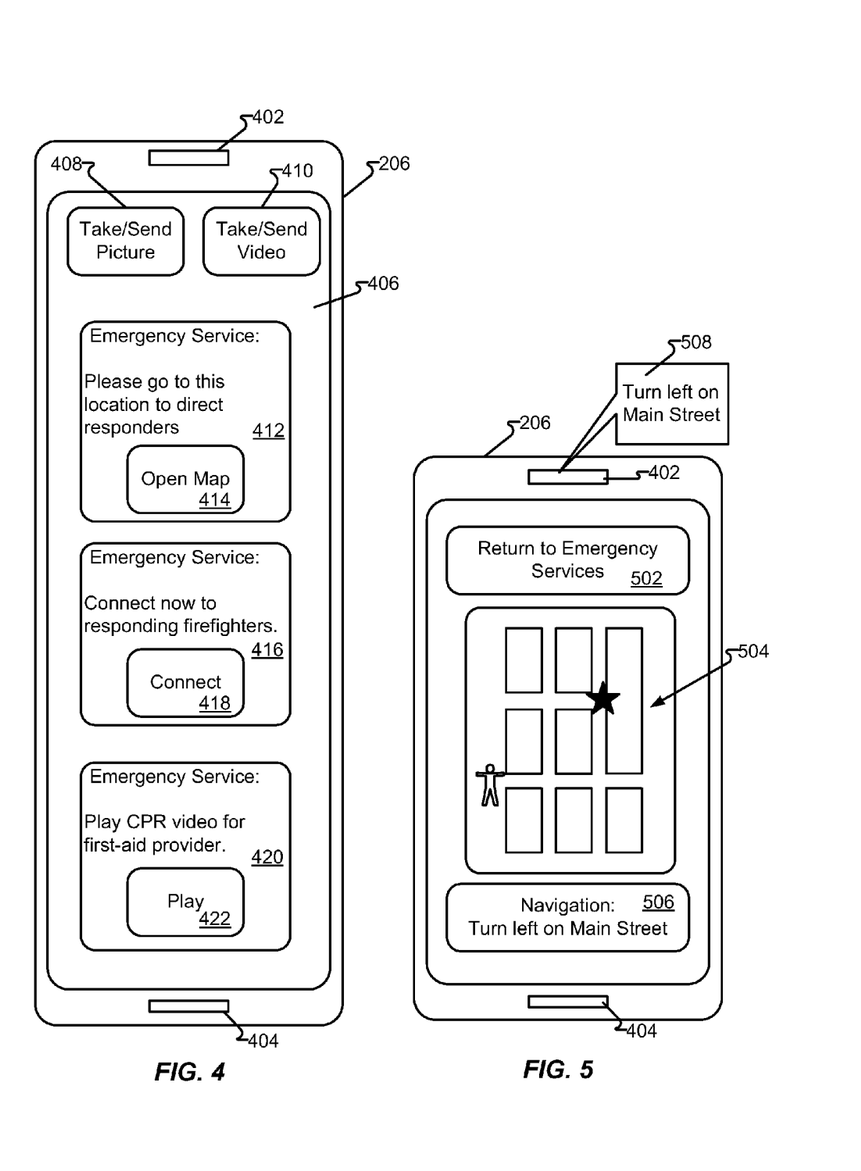
FIG. 4 illustrates a first view of a user device in accordance with at least some embodiments of the present disclosure.
FIG. 5 illustrates a second view of a first user device in accordance with at least some embodiments of the present disclosure.

FIG. 4 illustrates a first view of first user device 206 in accordance with at least some embodiments of the present disclosure. In one embodiment, FIG. 4 illustrates first user device 206, albeit in an exaggerated form to more clearly illustrate potential content displayed thereon, but typically not at the same time, such as when a non-exaggerated form includes a scrolling or paging feature. First user device 206 comprises input and output means, such as speaker 402, microphone 404, and touch display 406. Other input and output components, not shown, include antenna to enable cellular, Wi-Fi, and GPS functionality as well as other electromagnetic and/or mechanical signal receivers, transmitters, and processors. First user device 206 may also comprise still and/or video camera, speakerphone, etc.

In one embodiment, first user device 206 has established a data channel interaction with PSAP server 216. Touch display 406 presents various options for interacting with PSAP server 216 and/or resource 112. For example, portion 408 prompts the user to take and send a picture of the emergent event for use by PSAP personnel, such as resource 112, and/or third-party 220, or other parties operable to mitigate the emergent situation. Portion 410 provides the user with a means to initiate capturing and/or sending video of the emergent event to appropriate personnel. While audio communications may be provided via the data channel and/or a voice-only channel, other content is exchanged via the data channel, content such as messages 412, 416, 420; video; images; and/or position data. In another example, message 412 provides instructions for the user of device 206 to relocate to a certain position. Button 414, such as a "soft button," provides a means for first user 204 to launch a map application on first user device 206 (see FIG. 5). Alternatively, the map application may automatically launch without receiving any human input to first user device 206.

In another embodiment, button 418 provides a trigger to initiate a connection with a third-party 220. For example, PSAP server 216 may provide a telephone number of an en route responder that, upon selecting portion 418, causes first user device 206 to initiate a telephone call to the responder. In another example, PSAP server causes first user device 206 to connect to third party 220 via data channel and may further initiate the connection without human input to first user device 206. As can be appreciated by those of ordinary skill in the art, other connections types may also be made with third party 220 (e.g., Bluetooth, near-field communications, infrared, social media, etc.) to convey voice, video, images, data files, position information, and/or other content. PSAP server 216 may monitor and/or supplement the interaction between first user 204 and third party 220. In another embodiment, interaction content, such as multimedia data, may be captured by first user device 206 and sent to PSAP server 216 and optionally for presentation to resource 112, interaction content and/or links to obtain the interaction content may also be received from PSAP server 216. For example, message 420 comprises instructions to play a CPR video, which would then be launched upon selecting button 422.

The multimedia content provided over the data channel may comprise audio, video, data files, URLs, GPS coordinates, animations, instructions, and/or other content, which may be helpful in mitigating the emergent situation. The data channel may be established as point-to-point (e.g., first user device 206 to/from PSAP server 216, second user device 212 to/from third party device 222, etc.), one-to-many (e.g., first user device 206 to/from a combination of PSAP server 216, third party device 222, etc.), many-to-one, and/or many-to-many.

FIG. 5 illustrates a second view of first user device 206 in accordance with at least some embodiments of the present disclosure. In one embodiment, first user device 206 has launched a map application, such as by the user selecting button 414 or as an automatic response to a signal received from PSAP server 216 to open the map application. In another embodiment, first user device 206 executes the mapping application comprising button 502 to return to the emergency services panel, see FIG. 4, such as when the user needs to provide or receive additional information from/to PSAP server 216 and/or resource 112. The map application may include a graphical display 504 to assist the user in navigating to the desired location. The map application may also comprise text-based instructions provided in message 506 and as a further option, audio instructions provided by spoken text 508 presented by speaker 402.

The map application may also report the location of first user device 206, and thereby first user 204, to PSAP server 216, agent 216, second user 210, and/or third party 220. The map application may also receive inputs, such as to enable first user 204 to touch a spot on a map and have the associated location conveyed to another party and/or PSAP server 216.

Figure 6:
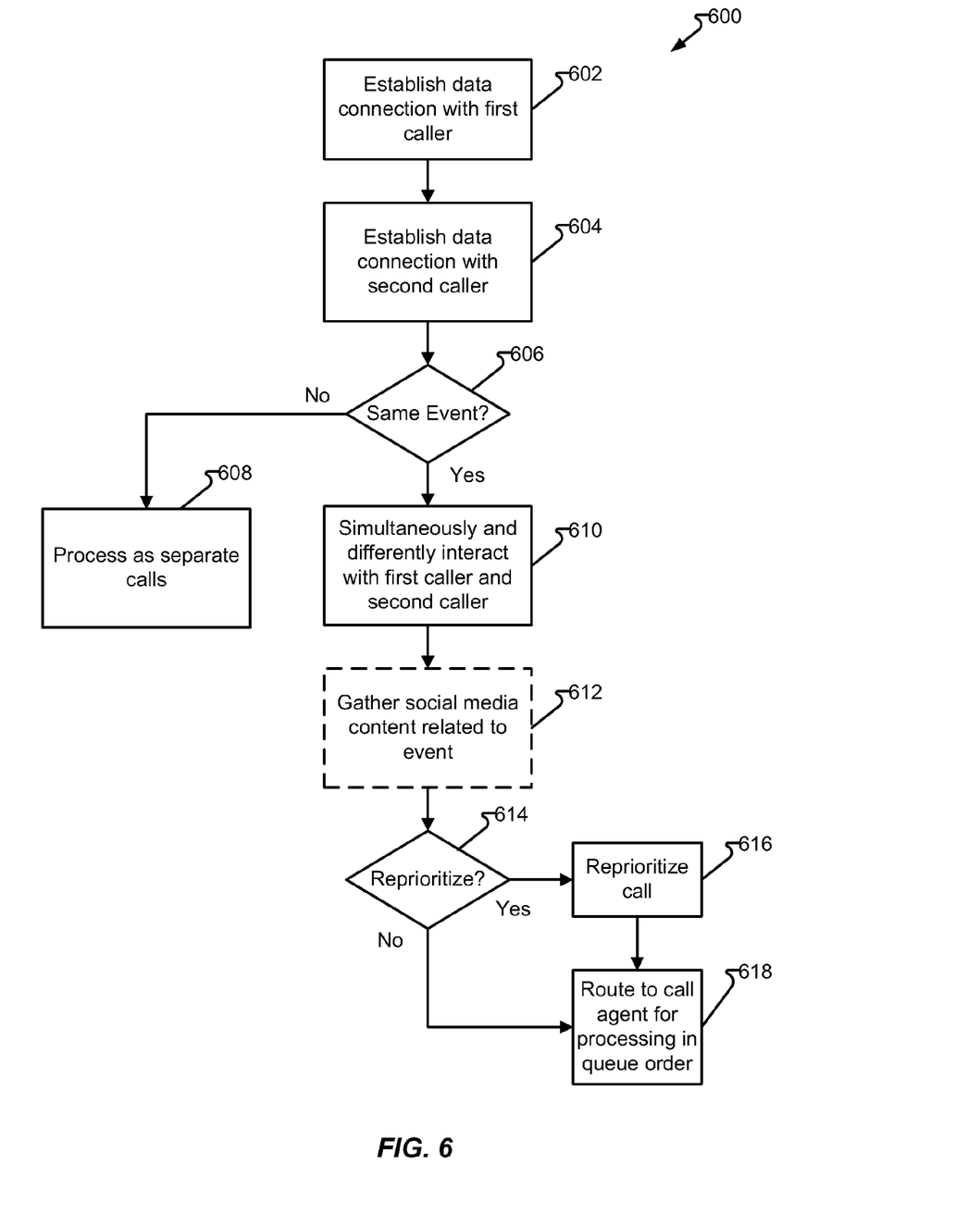
FIG. 6 illustrates a process in accordance with at least some embodiments of the present disclosure.

FIG. 6 illustrates process 600 in accordance with at least some embodiments of the present disclosure. In one embodiment, process 600 starts as a response to a voice call. However, establishing a data channel without having first established a voice channel is also provided herein. Step 602 establishes the data channel with first PSAP caller 204, whether in response to a voice channel or as a first channel of communication. Next, step 604 establishes a data connection with the second PSAP caller 210. As described with respect to step 602, step 604 may also be in response to a voice channel connection or omitting the voice channel connection and first connecting via a data channel.

Step 606 determines whether first PSAP caller 204 and/or second PSAP caller 210, via the data channels established during step 602 and 604 respectively, are reporting the same emergent event (e.g., emergent event 202). If step 606 determines they are not reporting the same event, processing may continue to step 608 whereby the calls are processed as separate calls. The separate calls may each initiate their own respective process 600.

Upon step 606 determining first 204 and second PSAP caller 210 are reporting the same emergent event, processing continues to step 610. Step 610 simultaneously interacts with the first PSAP caller 204 and second PSAP caller 210 albeit differently, as described herein. Optionally, step 612 obtains social media content related to the emergent event. Step 614 determines whether a reprioritization is required. If no, processing continues to step 618 where calls are presented to an agent, such as resource 112, in the queue order. If yes, processing continues to step 616 whereby the queue is re-prioritized, such as second PSAP caller 210 is moved ahead of first PSAP caller 204. Upon completion of step 616, processing continues to 618 where the agent is presented with the callers in the queue order.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium, such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system, comprising:
   a public safety access point (PSAP), comprising:
   a PSAP resource; and
   a PSAP server that, upon determining that a first PSAP caller and a second PSAP caller are both calling the PSAP with respect to a common emergent event, enables a single PSAP agent to simultaneously interact with the first PSAP caller and the second PSAP caller over a first and second data channel, respectively, and wherein a first multimedia content provided to the first data channel differs from a second multimedia content provided to the second data channel.

2. The system of claim 1 wherein the simultaneous interaction comprises a media type received via the data channel from the first PSAP caller that is different from media type received by the second PSAP caller.

3. The system of claim 2, wherein the difference in the media type comprises at least one of audio, video, text, data file, still image, motion, and direction content.

4. The system of claim 1, wherein the difference between the interaction with the first PSAP caller and the second PSAP caller comprises a media type sent by PSAP to the first PSAP caller that is different from the media type sent to the second PSAP caller.

5. The system of claim 4, wherein the media type comprises at least one of different audio, video, graphics, images, and repositioning instructions.

6. The system of claim 4, wherein the different media type further comprises an instruction to one of the first PSAP caller and the second PSAP caller to initiate a interaction with a third party.

7. The system of claim 1, wherein:
   the PSAP server is further configured to evaluate social media content related to the emergent event and modify the interaction between the single PSAP agent and at least one of the first and second PSAP caller in accord with the evaluated social media content.

8. The system of claim 1, wherein the PSAP sever is operable to reorder a queue comprising first and second PSAP callers waiting to interact with the single PSAP agent, wherein the reordering is performed in response the second PSAP caller having at least one of a location determined to be more relevant to the emergent event, a location determined to be more relevant to a responder to the emergent, more relevant data channel content, a greater opportunity to mitigate the emergent event, and a greater opportunity to provide data channel content to the responder to the emergent event.

9. A method comprising:
    establishing a first data channel connection between a public safety access point (PSAP) and a first customer device and a second data channel connection between the PSAP and a second customer device associated with a first and second PSAP callers, respectively;
    determining, by a PSAP server, whether the first and second PSAP callers are reporting a common emergent event; and
    upon determining that the first and second PSAP callers are reporting a common emergent event, causing a single PSAP agent to simultaneously interact via the first data channel with the first PSAP caller and via the second data channel with the second PSAP caller with respect to the common emergent event, and wherein a first multimedia content provided to the first data channel differs from a second multimedia content provided to the second data channel.

10. The method of claim 9, wherein the interaction comprises receiving media type from the first PSAP caller that is different from the media type of the second PSAP caller.

11. The method of claim 10, wherein the media type comprises at least one of voice, data, video, still image, data file, motion, and direction.

12. The method of claim 9, wherein the interaction further comprises the PSAP sending media type to the first PSAP caller that is different from the media type of the second PSAP caller.

13. The method of claim 12, wherein the media type comprises audio, video, textual, graphical, and repositioning instructions.

14. The method of claim 12, wherein the interaction comprises instructions to at least one of the first and second PSAP caller to initiate an interaction with a third party.

15. The method of claim 9, further comprising
    receiving social media content regarding the emergent event from a social media source;
    evaluating the social media content; and
    modifying the interaction with at least one of the first and second PSAP caller in accord with the evaluated social media content.

16. The method of claim 9, further comprising:
    determining the second PSAP caller should be placed in a queue for processing by the single PSAP agent ahead of the first PSAP caller; and
    wherein the step of determining further comprises, determining the second PSAP caller has at least one of a location determined to be more relevant to the emergent event, a location determined to be more relevant to a responder to the emergent, more relevant data channel content, a greater opportunity to mitigate the emergent event, and a greater opportunity to provide data channel content to the responder to the emergent event.

17. A non-transitory computer readable medium that when read by a computer causes the computer to:
    establish a first data channel connection between a public safety access point (PSAP) and a first customer device and a second data channel connection between the PSAP and a second customer device associated with a first and second PSAP callers, respectively;
    determine, by a PSAP server, whether the first and second PSAP callers are reporting a common emergent event; and
    upon determining that the first and second PSAP callers are reporting a common emergent event, cause a single PSAP agent to simultaneously interact via the first data channel with the first PSAP caller and via the second data channel with the second PSAP caller with respect to the common emergent event, and wherein a first multimedia content provided to the first data channel differs from a second multimedia content provided to the second data channel.

18. The non-transitory medium of claim 17, the interaction comprises receiving media type from the first PSAP caller that is different from the media type of the second PSAP caller.

19. The non-transitory medium of claim 17, wherein the instructions to cause the single PSAP agent to simultaneously interact via the first data channel with the first PSAP caller and via the second data channel with the second PSAP caller with respect to the emergent event, further comprise instructions to cause the single PSAP agent to send a first media type to the first PSAP caller that is different from a second media type sent to the second PSAP caller.

20. The non-transitory medium of claim 17, further comprising instructions to cause the computer to perform:
    receiving social media content regarding the emergent event from a social media source;
    evaluating the social media content; and
    modifying the interaction with at least one of the first and second PSAP caller in accord with the evaluated social media content.

* * * * *